United States Patent
Kim

(10) Patent No.: US 10,001,852 B2
(45) Date of Patent: Jun. 19, 2018

(54) LIQUID CRYSTAL DISPLAY DEVICE AND METHOD OF DRIVING THE SAME

(71) Applicant: LG Display Co., Ltd., Seoul (KR)

(72) Inventor: HoonBae Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 365 days.

(21) Appl. No.: 13/893,497

(22) Filed: May 14, 2013

(65) Prior Publication Data

US 2013/0307820 A1 Nov. 21, 2013

(30) Foreign Application Priority Data

May 18, 2012 (KR) .......................... 10-2012-0053224

(51) Int. Cl.
*G06F 3/045* (2006.01)
*G06F 3/041* (2006.01)
*G06F 3/044* (2006.01)

(52) U.S. Cl.
CPC ............ *G06F 3/0412* (2013.01); *G06F 3/044* (2013.01)

(58) Field of Classification Search
CPC ................................ G06F 3/044; G06F 3/0412
USPC .................................................. 345/173–174
See application file for complete search history.

(56) References Cited

U.S. PATENT DOCUMENTS

| | | | | |
|---|---|---|---|---|
| 5,534,892 | A * | 7/1996 | Tagawa ................. | G06F 3/0412 178/20.01 |
| 2008/0062147 | A1* | 3/2008 | Hotelling et al. ............ | 345/174 |
| 2010/0238134 | A1 | 9/2010 | Day et al. | |
| 2010/0302227 | A1 | 12/2010 | Sasaki et al. | |
| 2010/0328256 | A1 | 12/2010 | Harada et al. | |
| 2011/0109568 | A1 | 5/2011 | Wu et al. | |
| 2011/0141040 | A1 | 6/2011 | Kang et al. | |
| 2011/0148435 | A1* | 6/2011 | Schwartz .............. | G06F 3/0416 324/658 |
| 2011/0242444 | A1* | 10/2011 | Song .............................. | 349/43 |

(Continued)

FOREIGN PATENT DOCUMENTS

| | | | |
|---|---|---|---|
| CN | 102096499 A | 6/2011 | |
| CN | 103390391 A | 11/2013 | |

(Continued)

OTHER PUBLICATIONS

First Notification of Office Action dated Jul. 21, 2015 from the State Intellectual Property Office of China in counterpart Chinese application No. 201310180860.3.

*Primary Examiner* — Hang Lin
(74) *Attorney, Agent, or Firm* — Morgan, Lewis & Bockius LLP

(57) ABSTRACT

Disclosed is an LCD device and a method of driving the same. The LCD device includes a liquid crystal panel configured to comprise a TFT substrate and a color filter substrate; a touch panel configured to comprise a plurality of electrode units parallel to the gate lines to detect a touch, each of the electrode units comprising a plurality of driving electrodes and a plurality of receiving electrodes; a common voltage generator configured to generate a common voltage; a touch sensing unit configured to supply the common voltage to the electrode units and sequentially supply a driving voltage to driving electrodes formed in scanned electrode units, corresponding to scanned gate lines which have received a scan signal for one frame period, to detect a touch; and a driving voltage generator configured to generate the driving voltage.

9 Claims, 7 Drawing Sheets

(56) References Cited

U.S. PATENT DOCUMENTS

2011/0304571 A1* 12/2011 Kim et al. .................. 349/139
2013/0293498 A1   11/2013 Kim et al.

FOREIGN PATENT DOCUMENTS

| JP | 2011008726 A | 1/2011 |
| KR | 2006-0128447 A | 12/2006 |
| KR | 2010-0129145 A | 12/2010 |

* cited by examiner (a)

(b)

(c)

LIQUID CRYSTAL DISPLAY DEVICE AND METHOD OF DRIVING THE SAME

CROSS-REFERENCE TO RELATED APPLICATIONS

This application claims the benefit of the Korean Patent Application No. 10-2012-0053224 filed on May 18, 2012, which is hereby incorporated by reference as if fully set forth herein.

BACKGROUND

Field of the Invention

The present invention relates to a Liquid Crystal Display (LCD) device, and more particularly, to an LCD device having a built-in touch panel and a method of driving the same.

Discussion of the Related Art

LCD devices adjust the light transmittance of liquid crystal with an electric field to display an image. To this end, the LCD devices include a liquid crystal panel in which a plurality of pixels are arranged in a matrix type, and a driver for driving the liquid crystal panel.

Methods, which input a control signal into an electronic product with LCD devices mounted thereon, include a method using a touch panel and a method using buttons. Recently, the method using the touch panel is widely used.

LCD devices with a touch panel mounted thereon are being applied to various electronic products such as navigations, industrial terminals, tablet PCs, smart phones, financial automation equipments, game machines, etc. Also, the LCD devices are being expanded in application because all users can easily manipulate the LCD devices with touch screen.

FIG. 1 is an exemplary diagram for describing a related art method of driving a touch panel. FIG. 2 is an exemplary diagram illustrating various types of LCD devices with a touch panel. A touch panel shown in a portion (a) of FIG. 2 is an on-cell type, a touch panel shown in a portion (b) of FIG. 2 is a hybrid in-cell type, and a touch panel shown in a portion (c) of FIG. 2 is an in-cell type. In FIG. 2, reference numeral 31 is a TFT substrate, reference numeral 32 is a color filter substrate, reference numeral 33 is a liquid crystal layer, and reference numeral 34 is glass.

A touch panel 40 detects a touch generated by a user. Touch panels may be categorized into a resistive type, a capacitive type, etc. Hereinafter, however, a capacitive type touch panel will be described.

A touch panel 40 includes a driving electrode 11 to which a driving voltage is applied and a receiving electrode 21 receiving a sensing signal generated by a driving voltage. A touch sensing unit 60 includes a driving voltage generator 61 applying a driving voltage to the driving electrode 11 and a sensing signal receiver 62 determining whether there is a touch by using a sensing signal received through the receiving electrode 21.

A touch panel 40 may be formed in various types depending on a disposed position.

First, as shown in a portion (a) of FIG. 2, the touch panel 40 may be adhered to an upper end surface of a color filter substrate 32, namely, the touch panel may be configured in an on-cell type.

Second, as shown in a portion (b) of FIG. 2, one of two electrodes 11 and 21 configuring the touch panel 40 may be formed in the TFT substrate 31 of the LCD device, and the other may be formed in an upper end surface of a color filter substrate 32, namely, the touch panel 40 may be configured in a hybrid in-cell type.

Third, as shown in a portion (c) of FIG. 2, two electrodes 11 and 21 configuring a touch panel 40 may be formed on the same layer of a TFT substrate 31 configuring a LCD device, namely, the touch panel 40 may be configured in an in-cell type. The two electrodes 11 and 21 applied to the in-cell type touch panel are respectively used as a driving electrode and a receiving electrode for a touch sensing period. However, all of the two electrodes are used as common electrodes receiving a common voltage for an image display period.

FIG. 3 is various waveform diagrams illustrating an image display period and a touch sensing period in a related art LCD device.

A portion (a) of FIG. 3 shows an image display period in a normal LCD device with no touch panel. A waveform shown in the portion (a) of FIG. 3 may be a vertical sync signal Vsync. In this case, one frame period includes an image display period (display) for which an image is displayed and a blank period for which an image is not displayed.

A portion (b) of FIG. 3 shows an image display period and a touch sensing period in the LCD device (hereinafter referred to as "in-cell type LCD device") with the in-cell type touch panel built therein.

The related art in-cell type LCD device has the following limitations.

First, as shown in the portion (b) of FIG. 3, in the in-cell type LCD device, the two electrodes configuring the touch panel are used as the common electrode, and thus, an image display operation and a touch sensing operation cannot simultaneously be performed. Therefore, as shown in the portion (b) of FIG. 3, one frame period includes an image display period (display) and a touch sensing period (touch).

When a LCD device is driven at a frequency of 60 Hz, one frame period is set to a time of 16.7 ms. Therefore, as resolution and a size of a liquid crystal panel increase, a driving period for one channel becomes relatively shorter. In this case, an image display function and a touch sensing function can be degraded in performance due to an insufficient charging time.

That is, as shown in the portion (b) of FIG. 3, in the in-cell type LCD device, it is required to divide the image display period and the touch sensing period. Therefore, as a size of the liquid crystal panel increases, the number of channels increases, and thus, the image display function and the touch sensing function can be degraded in performance.

Second, in the in-cell type LCD device shown in the portion (b) of FIG. 3, because a direction of a data line does not match a direction of the receiving electrode 21, the in-cell type LCD device is vulnerable to a data noise. That is, because a sensing signal induced by the driving voltage supplied to the driving electrode 11 is transferred to the sensing signal receiver 62 through the receiving electrode, more noise is generated in the receiving electrode 21 than the driving electrode 11. Therefore, there is much possibility that a noise is generated in a data line disposed in parallel to the receiving electrode.

SUMMARY

Accordingly, the present invention is directed to provide an LCD device and a method of driving the same, which substantially obviate one or more problems due to limitations and disadvantages of the related art.

An aspect of the present invention is directed to provide an LCD device and a method of driving the same, which sequentially drive a plurality of driving electrodes formed in a electrode unit, corresponding to gate lines which have received a scan signal, to detect a touch when the scan signal is being sequentially supplied to a plurality of gate lines.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided an LCD device including: a liquid crystal panel configured to comprise a TFT substrate and a color filter substrate which are coupled to each other with a liquid crystal layer therebetween; a touch panel configured to comprise a plurality of electrode units parallel to the gate lines to detect a touch, each of the electrode units comprising a plurality of driving electrodes, formed in parallel to data lines formed in the TFT substrate, and a plurality of receiving electrodes formed in parallel to gate lines formed in the TFT substrate to intersect the driving electrodes; a common voltage generator configured to generate a common voltage; a touch sensing unit configured to supply the common voltage to the electrode units and sequentially supply a driving voltage to driving electrodes formed in scanned electrode units, corresponding to scanned gate lines which have received a scan signal for one frame period, to detect a touch; and a driving voltage generator configured to generate the driving voltage.

To achieve these and other advantages and in accordance with the purpose of the invention, as embodied and broadly described herein, there is provided a method of driving a LCD device including: supplying a common voltage to a plurality of electrode units parallel to a plurality of gate lines, each of the electrode units comprising a plurality of driving electrodes, formed in parallel to a plurality of data lines, and a plurality of receiving electrodes formed in parallel to the gate lines to intersect the driving electrodes; and sequentially supplying a driving voltage to driving electrodes formed in scanned electrode units, corresponding to scanned gate lines which have received a scan signal for one frame period, to detect a touch while the common voltage is supplied to the electrode units.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings.

Figure 1:
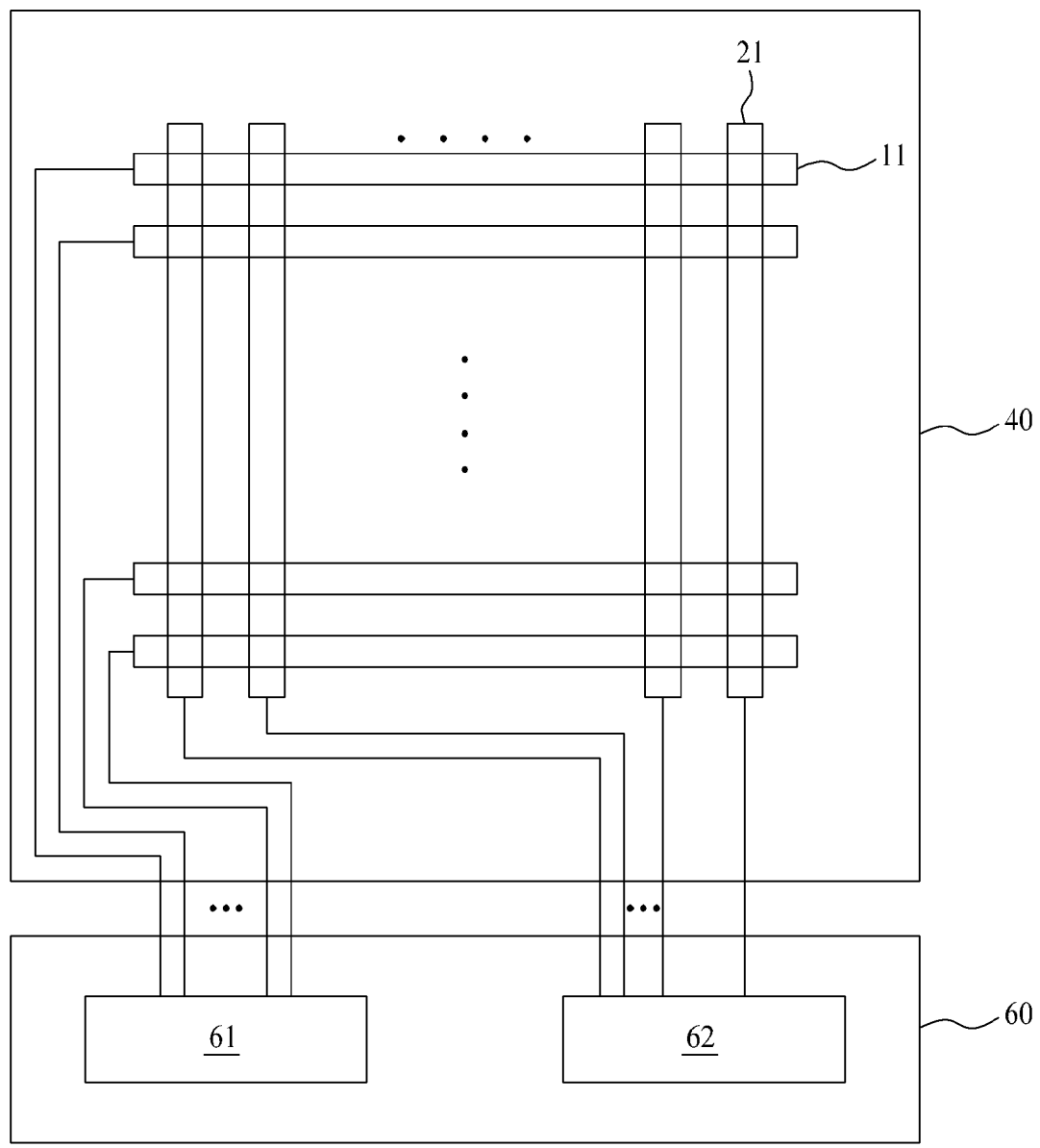
FIG. 1 is an exemplary diagram for describing a related art method of driving a touch panel.
Figure 2:
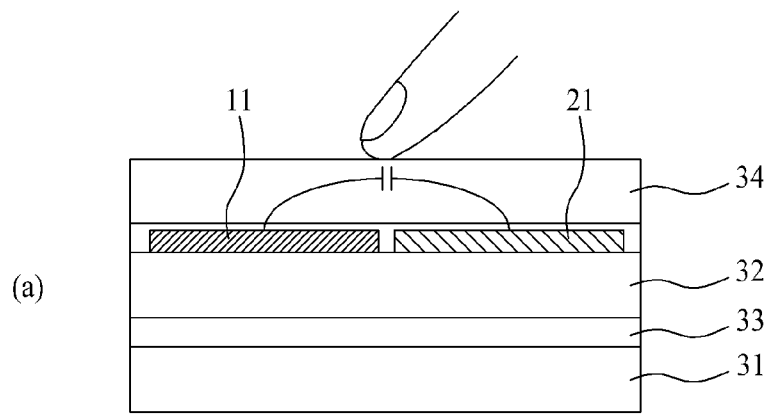
FIG. 2 is an exemplary diagram illustrating various types of LCD devices with a touch panel.
Figure 2:
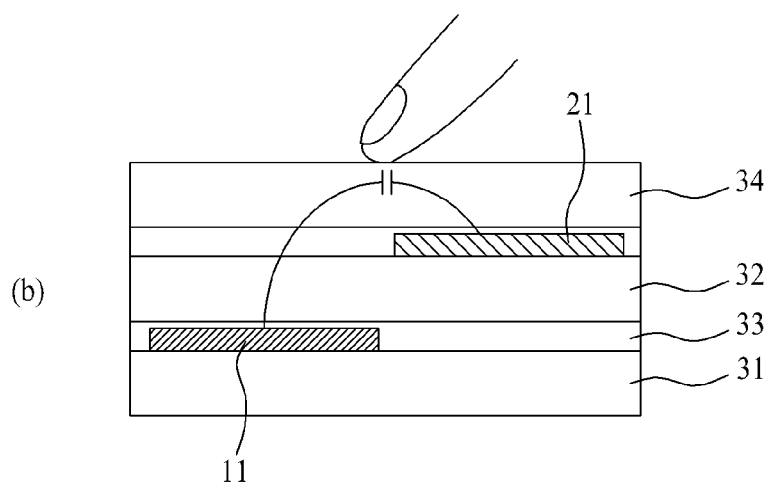
Figure 2:
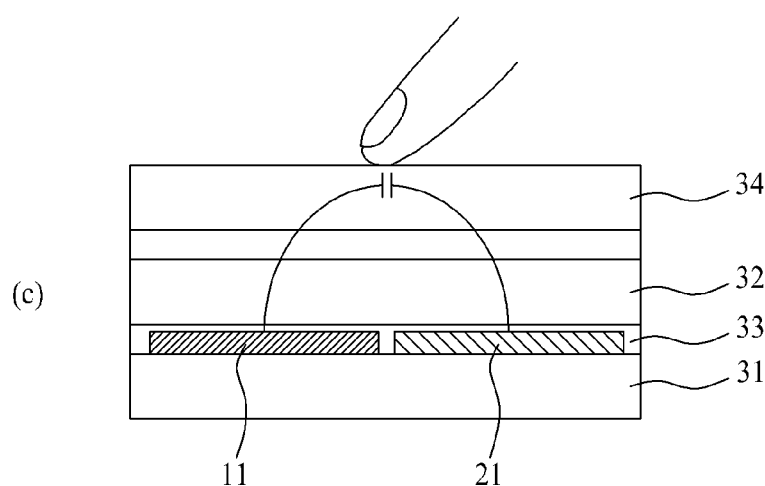
Figure 3:
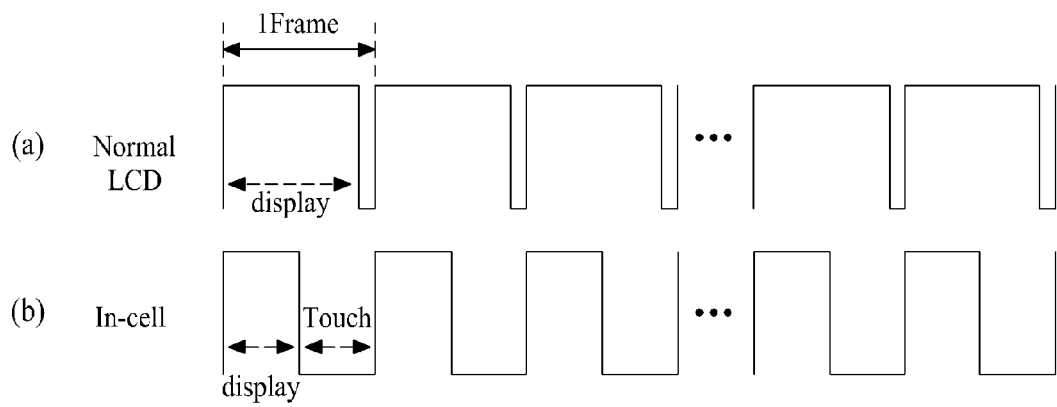
FIG. 3 is various waveform diagrams illustrating an image display period and a touch sensing period in a related art LCD device.
Figure 4:
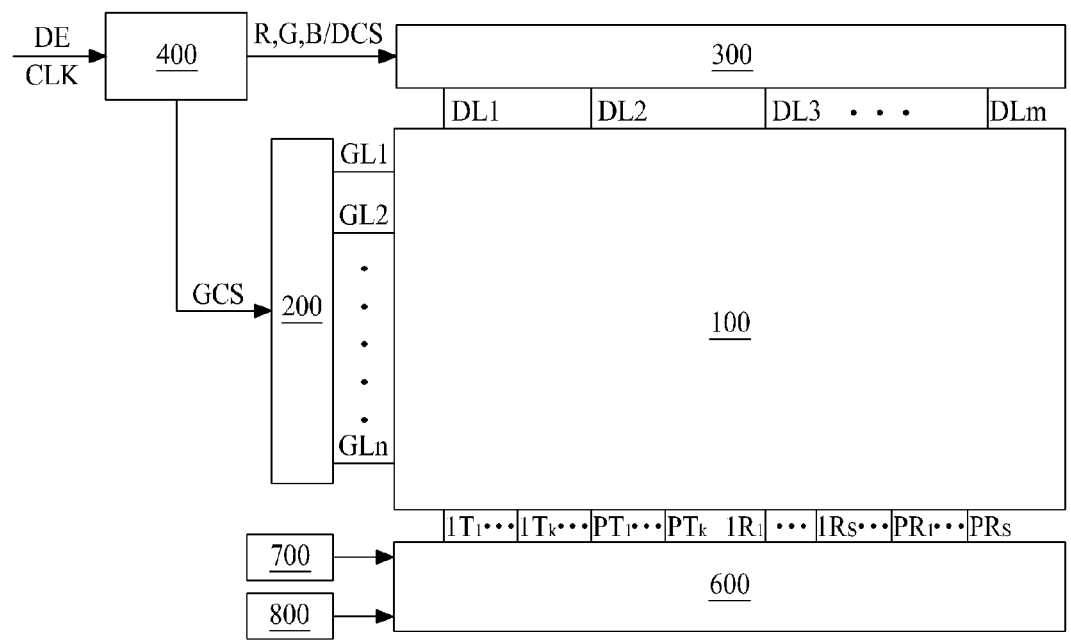
FIG. 4 is an exemplary diagram illustrating a configuration of an LCD device according to an embodiment of the present invention.
Figure 5:
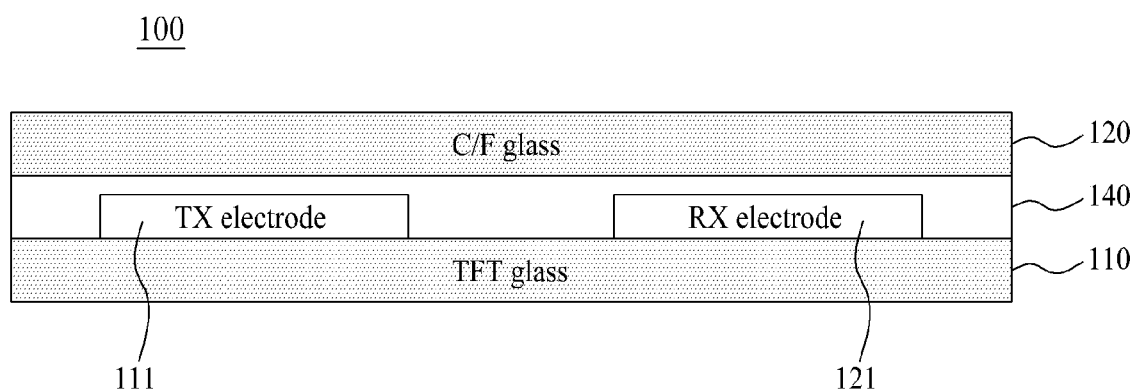
FIG. 5 is an exemplary diagram schematically illustrating a sectional surface of a liquid crystal panel of the LCD device according to the embodiment of the present invention.
Figure 6:
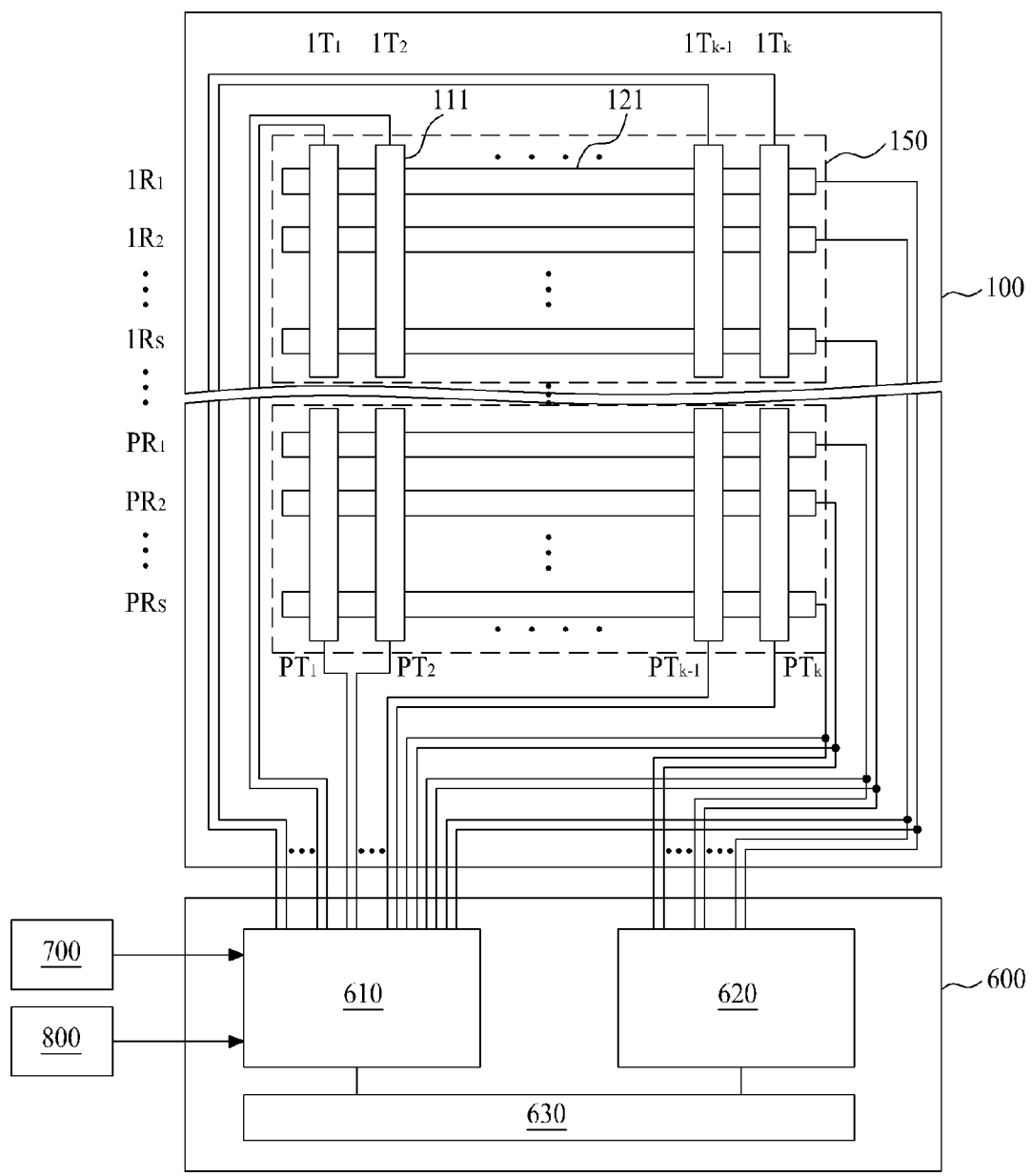
FIG. 6 is an exemplary diagram schematically illustrating configurations of a touch panel and a touch sensing unit applied to the LCD device according to an embodiment of the present invention.

FIG. 4 is an exemplary diagram illustrating a configuration of an LCD device according to an embodiment of the present invention, FIG. 5 is an exemplary diagram schematically illustrating a sectional surface of a liquid crystal panel of the LCD device according to the embodiment of the present invention, and FIG. 6 is an exemplary diagram schematically illustrating configurations of a touch panel and a touch sensing unit 600 applied to the LCD device according to an embodiment of the present invention.

The present invention relates to a in-cell type LCD device. The present invention sequentially drives a plurality of gate lines for displaying an image and a plurality of driving electrodes for sensing a touch, at certain time intervals in a state where the driven gate lines and the driven driving electrodes are spatially separated from each other. That is, in the present invention, the driving of the driving electrodes for sensing a touch does not affect the driving of the gate lines for displaying an image.

To this end, as shown in FIGS. 4 and 5, the LCD device according to the present invention includes a liquid crystal panel 100 with a in-cell type touch panel built therein, a gate driver 200 applying a scan signal to the gate lines formed in the liquid crystal panel 100, a data driver 300 applying data voltages to a plurality of data lines formed in the liquid crystal panel 100, a timing controller 400 controlling the data driver 300 and the gate driver 200, a common voltage generator 700 applying a common voltage to a driving electrode, a driving voltage generator 800 applying a driving voltage to the driving electrode, and a touch sensing unit 600 applying the driving voltage to the driving electrode of the touch panel and processing a sensing signal received from a receiving electrode of the touch panel to determine whether there is a touch.

First, as shown in FIG. 5, the liquid crystal panel 100 includes a TFT substrate 110 in which a plurality of pixels are respectively formed in a plurality of areas defined by the intersection of the gate lines and the data lines, a color filter substrate 110 in which a color filter is formed, a driving electrode (TX electrode) 111 and a receiving electrode (RX electrode) formed in the same layer of the TFT substrate 110, and a liquid crystal layer 140 formed of liquid crystal filled between the TFT substrate 110 and the color filter substrate 120.

The touch panel applied to the present invention is a capacitive type touch panel, and particularly, is the in-cell type touch panel among the on-cell type touch panel, the in-cell type touch panel and the hybrid in-cell type touch panel described above in the background. As shown in FIG. 6, the in-cell type touch panel applied to the present invention includes a plurality of the driving electrodes 111 (1T1-1Tk to PT1-PTk), and a plurality of the receiving electrodes 121 (1R1-1Rs to PR1-PRs). Here, the driving electrodes and the receiving electrodes are formed in the TFT substrate 110.

Particularly, the driving electrodes 111 and the receiving electrodes 121 are formed on the same layer in the TFT substrate. In this case, the driving electrode or the receiving electrode is formed on another layer through a contact hole, in an intersection area of the driving electrode and the receiving electrode, and thus, the driving electrode and the receiving electrode do not substantially contact each other. Therefore, the driving electrodes and the receiving electrodes may be formed in the TFT substrate by using various methods satisfying the above-described configuration.

Moreover, as shown in FIG. 6, in the touch panel applied to the present invention, a plurality of electrode units 150 parallel to the gate lines are formed in the touch panel. Here, each of the electrode units 150 includes the driving electrodes 111 formed in parallel to the data lines formed in the TFT substrate, and the receiving electrodes 121 formed in parallel to the gate lines formed in the TFT substrate to intersect the driving electrodes. That is, in FIG. 6, a first electrode unit includes 1R1st to 1Rsth receiving electrodes, and 1T1st to 1Tkth driving electrodes. Also, a pth electrode unit includes PR1st to PRsth receiving electrodes and PT1st to PTkth driving electrodes.

The touch panel may be configured with two or more electrode units 150, and FIG. 6 shows a touch panel configured with P number of electrode units 150.

Next, the timing controller 400 receives a timing signal such as the data enable signal DE, the dot clock DCLK or the like from an external system to generate the control signals GCS and DCS for controlling an operation timing of the data driver 300 and the gate driver 200. Moreover, the timing controller aligns input video data transferred from the external system to supply aligned image data to the data driver 300.

Moreover, in addition to controlling the data driver 300 and the gate driver 200, the timing controller 400 may generate control signals controlling an input/output operation timing of the touch sensing unit 600 to control the touch sensing unit 600.

Next, the data driver 300 converts the image data received from the timing controller 400 into analog data voltages and respectively supplies the data voltages for one horizontal line to the data lines at every one horizontal period where the scan signal is supplied to one gate line. That is, the data driver 300 converts the image data into the data voltage by using gamma voltages supplied from a gamma voltage generator (not shown), and respectively outputs the data voltages to the data lines.

That is, the data driver 300 shifts a source start pulse SSP supplied from the timing controller 400 to generate a sampling signal according to a source shift clock SSC. Furthermore, the data driver 300 latches the image data RGB, which are inputted according to the source shift clock SSC, according to the sampling signal to convert the image data into the data voltage, and then, supplies the data voltage to the data lines in units of a horizontal line in response to a source output enable signal SOE.

To this end, the data driver 300 may include a data sampler, a latch, a digital-to-analog converter and an output buffer.

Next, the gate driver 200 shifts a gate start pulse GSP transferred from the timing controller 400 to sequentially supply a scan signal having a gate-on voltage Von to the gate lines GL1 to GLn according to a gate shift clock GSC. Furthermore, the gate driver 200 supplies a gate-off voltage Voff to the gate lines GL1 to GLn for a period where a scan signal having the gate-on voltage Von is not supplied to the gate lines GL1 to GLn.

Here, the gate driver 200 applied to the present invention may be manufactured independently from the panel and electrically connected to the panel in various types, but the present invention is not limited thereto. As another example, the gate driver 200 may be provided in the Gate In Panel (GIP) type where the gate driver 200 is mounted into the liquid crystal panel. In this case, the gate control signals controlling the gate driver 200 may be a start signal VST and a gate clock GCLK.

Next, the common voltage generator 700 generates the common voltage supplied to the driving electrodes 111, so as to output an image. The common voltage generated from the common voltage generator 700 is supplied to the driving electrodes 111 through the touch sensing unit 600.

Next, the driving voltage generator 800 generates the driving voltage supplied to the driving electrodes 111, so as to detect a touch. The driving voltage generated from the driving voltage generator 800 is supplied to the driving electrodes 111 through the touch sensing unit 600. The common voltage generator 700 and the driving voltage generator 800 may be integrated into a voltage generating unit. Moreover, the common voltage and the driving voltage may have different levels or the same level.

Finally, the touch sensing unit 600 continuously supplies the common voltage to the electrode units 150 for one frame period. Also, the touch sensing unit 600 sequentially supplies the driving voltage to the driving electrodes 111 formed in the electrode unit, corresponding to the gate lines which have received the scan signal, to detect a touch when the common voltage is being supplied to a plurality of the electrode units.

That is, when a driving voltage for detecting a touch is applied to the driving electrodes 111 of the touch panel, by user touching a specific area of the liquid crystal panel 100 with a finger or a pen, capacitances between the driving electrodes 111 and the receiving electrodes 121 are changed, and the capacitance changes effect the changes in voltage value (sensing signals) applied to the touch sensing unit 600 through the receiving electrodes.

The receiving electrodes are connected to the touch sensing unit 600, and the touch sensing unit 600 determines whether there is a touch, by using the changed voltage values (sensing signals). In this case, the touch sensing unit 600 detects a touch in units of an area in which the electrode unit 150 is formed.

For example, in FIG. 6, when the common voltage is being supplied to the first electrode unit (1R1th to 1Rs and 1T1 to 1Tk), the touch sensing unit 600 supplies the driving voltage to the driving electrodes PT1 to PTk formed in a Pth electrode unit (PR1 to PRs and PT1 to PTk), and then detects whether there is a touch by using the sensing signal received from the receiving electrodes PR1 to PRs formed in the Pth electrode unit.

For another example, in FIG. 6, when the common voltage is being supplied to the Pth electrode unit (PR1th to PRs and PT1 to PTk), the touch sensing unit 600 supplies the driving voltage to the driving electrodes 1T1 to 1Tk formed in the first electrode unit (1R1 to 1Rs and 1T1 to 1Tk), and then detects whether there is a touch by using the sensing signal received from the receiving electrodes 1R1 to 1Rs formed in the first electrode unit.

The above-described touch sensing unit 600 may be configured to detect only a touch, and in this case, a sensing signal, which is received through the touch sensing unit 600 when a touch is being detected, may be processed in a separate touch point detecting unit (not shown) or the timing controller 400, thereby detecting a touch point. However, the above-described touch sensing unit 600 may be configured to determine whether there is a touch and directly detect a touch point.

The present invention sequentially drives the gate lines for displaying an image and the driving electrodes for sensing a touch at certain time intervals and certain spatial intervals. That is, the present invention drives the driving electrodes, to which the common voltage Vcom for displaying an image and the driving voltage Vd for detecting a touch are supplied, and the gate lines at certain time intervals. Particularly, the present invention sequentially drives driving electrodes formed in the electrode unit 150, corresponding to gate lines which have received the scan signal, to detect a touch when the scan signal is being sequentially supplied to the gate lines.

Hereinafter, the internal configuration and function of the touch sensing unit 600 for performing the above-described function will be described in detail with reference to FIGS. 7 and 8.

Figure 7:
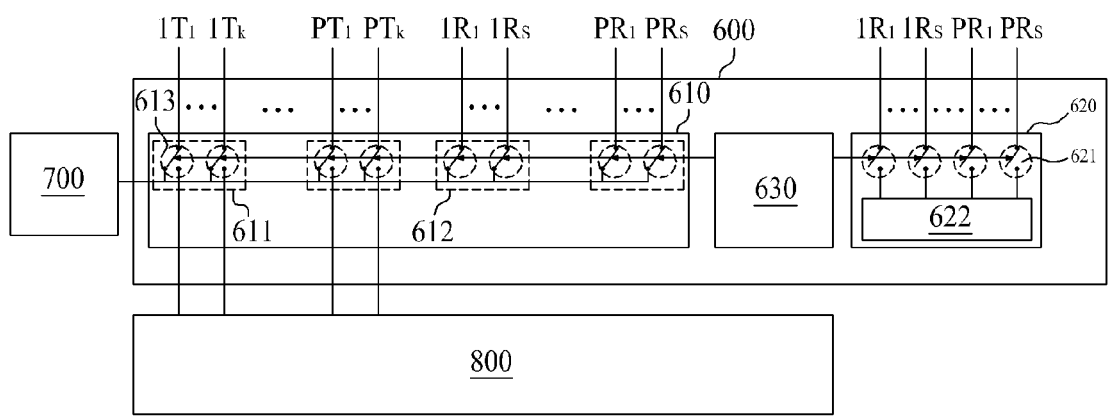
FIG. 7 is an exemplary diagram illustrating a configuration of the touch sensing unit applied to the LCD device according to the embodiment of the present invention.
Figure 8:
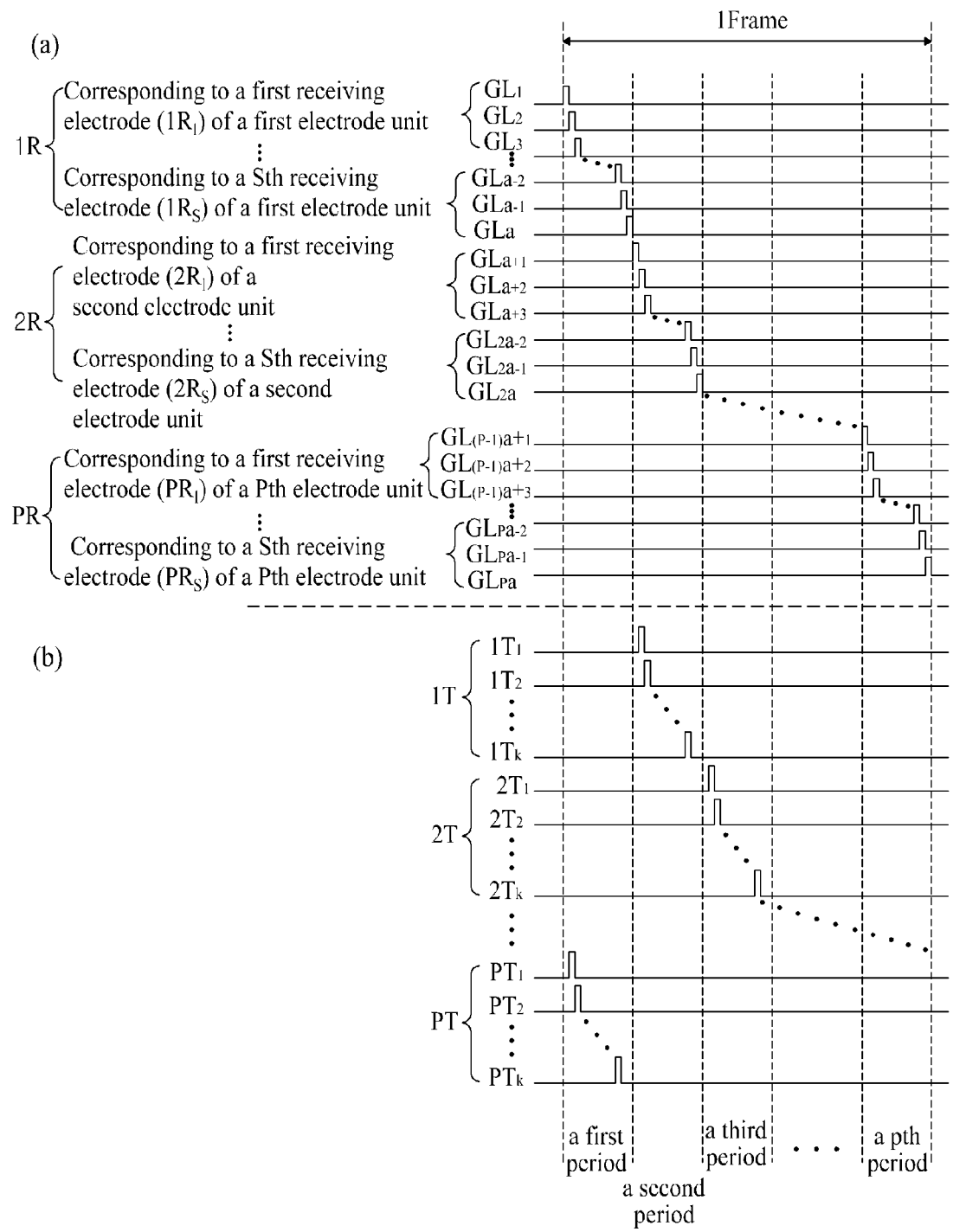
FIG. 8 is an exemplary diagram illustrating waveforms of various signals generated in the LCD device according to the embodiment of the present invention.

FIG. 7 is an exemplary diagram illustrating a configuration of the touch sensing unit applied to the LCD device according to the embodiment of the present invention, and FIG. 8 is an exemplary diagram illustrating waveforms of various signals generated in the LCD device according to the embodiment of the present invention.

The touch sensing unit 600 supplies the common voltage to the electrode units 150 for one frame period. Also, the touch sensing unit 600 sequentially supplies the driving voltage to the driving electrodes formed in the electrode unit 150, corresponding to the gate lines which have received the scan signal, to detect a touch when the common voltage is being sequentially supplied to the electrode unit.

Before describing the configuration of the touch sensing unit 600, terms to be described below will be first defined.

First, a scan input gate line denotes a gate line to which the scan signal is being inputted, namely, one gate line to which the scan signal is being inputted, among the gate lines. That is, a plurality of gate lines parallel to a horizontal line of the liquid crystal panel are formed in the liquid crystal panel, and scan signals are sequentially inputted to the gate lines for one frame period.

Second, a scanned gate line denotes a gate line to which the scan signal has been already inputted. The scan signal is outputted through the gate line for one horizontal period 1H in one frame period. Therefore, one gate line is referred to as "scanned input gate line" for one horizontal period where the scan signal is outputted to the gate line, and is referred to as "scanned gate line" for a period where the scan signal is not outputted to the gate line after the one horizontal period 1H. After one frame, if the scan signal is again inputted to the scanned gate line, the scanned gate line is again referred to as "scan input gate line".

Third, the electrode unit 150 is configured with the driving electrodes 111, which are formed in parallel to the data lines formed in the TFT substrate of the liquid crystal panel, and the receiving electrodes 121 which are formed in parallel to the gate lines formed in the TFT substrate to intersect the driving electrodes. Also, in the touch panel, at least two or more electrode units 150 are formed in a vertical direction of the liquid crystal panel, namely, formed in parallel to the gate lines. Because the receiving electrode 121 is formed in the liquid crystal panel so as to correspond to at least one or more gate lines and two or more receiving electrode are formed in the electrode unit 150, one electrode unit 150 corresponds to at least two or more gate lines.

Fourth, a scan input electrode unit denotes an electrode unit corresponding to at least one gate line receiving the scan signal. That is, one electrode unit 150 corresponds to at least two or more gate lines. If the scan signal is supplied to at least one gate line corresponding to an electrode unit 150, the electrode unit is referred to as "scan input electrode unit". The common voltage for displaying an image is supplied to the receiving electrode 121 and the driving electrode 111 formed in the scan input electrode unit.

Fifth, a scanned electrode unit is opposite to the scan input electrode unit in concept. That is, if the scan signal is not supplied to at least one gate line of the gate lines corresponding to the electrode unit operating as the scan input electrode unit, the scan input electrode unit becomes the scanned electrode unit. The driving voltage for detecting a touch may be sequentially supplied to the driving electrodes 111 formed in the scanned electrode unit.

Sixth, a scan input switch denotes a switch, connected to the scan input electrode unit corresponding to the scan input gate lines receiving the scan signal, among a plurality of driving electrode switches and receiving electrode switches included in the switching unit 610. The common voltage is supplied to the driving electrodes and receiving electrodes connected to the scan input switch. However, in addition to the driving electrodes and receiving electrodes connected to the scan input switch, the common voltage may be supplied to the other driving electrodes and receiving electrodes which are not connected to the scan input switch. That is, as shown in a portion (b) of FIG. 8, the common voltage may be continuously supplied to the driving electrodes and the receiving electrodes regardless of the supply of the scan signal. However, the common voltage is not supplied to the electrode unit to which the driving voltage for detecting a touch is supplied.

Seventh, a scanned switch denotes a switch, connected to the scanned electrode unit corresponding to the scanned gate lines receiving the scan signal, among the driving electrode switches and receiving electrode switches included in the switching unit 610. The driving voltage may be sequentially supplied to the driving electrodes connected to the scanned switches.

As shown in FIG. 6, the touch sensing unit 600 applied to the present invention includes a switching unit 610 that performs a common voltage transferring operation connecting the electrode units 150 to the common voltage generator 700 and performs a driving voltage transferring operation where the scanned driving electrodes formed in the scanned electrode unit connected to the common voltage generator 700 through the common voltage transferring operation are sequentially connected to the driving voltage generator 800, a touch sync signal generator 630 that generates a touch sync signal for controlling an operation of the switching unit 610, and a sensing signal receiver 620 that determines whether there is a touch by using the sensing signal received from the receiving electrode.

First, as shown in FIG. 7, the switching unit 610 may include a plurality of switches 613 for connecting the respective driving electrodes (T1-Tk to PT1-PTk) 111 to the common voltage generator 700 or the driving voltage generator 800. The Switches respectively connected to the driving electrodes are particularly referred to as "driving electrode switches". A collective name for the switches connected to the driving electrodes formed in one electrode unit is referred to as "driving electrode switching part 611".

Moreover, the switching unit 610 may be configured to include a plurality of switches for connecting the respective receiving electrodes to the common voltage generator 700. The switches respectively connected to the receiving electrodes are particularly referred to as "receiving electrode switches". A collective name for the switches connected to the receiving electrodes formed in one electrode unit is referred to as "receiving electrode switching part 612". It is not required to supply the driving voltage to the receiving electrode switches, and thus, the receiving electrode switches are not connected to the driving electrode generator 800.

Next, the sensing signal receiver 620 receives a sensing signal, generated with a driving voltage applied to the driving electrode 111, through the switching unit 610 from the receiving electrode 121, and determines whether there is a touch in the touch panel. Here, the determining may mean that the sensing signal receiver 620 determines whether a touch is made or not, or mean that the sensing signal receiver 620 determines whether a touch is made or not and directly determines a touched position.

To this end, the sensing signal receiver 620 includes a touch sensing part 622 that determines whether there is a touch by using the sensing signal received from the receiving electrodes, and a plurality of sensing switches 621 that are connected between the touch sensing part 622 and each of the receiving electrodes. In this case, the touch sync signal generator 630 transfers a third touch sync signal to the scan input sensing switches connected to the scan input receiving electrodes formed in the scan input electrode unit connected to the scan input switches of the switching unit 610. Here, the third touch sync signal allows the scan input sensing switch to be separated from the touch sensing part 622.

The common voltage is supplied to the receiving electrodes of the electrode unit receiving the common voltage, and the common voltage supplied to the receiving electrodes may be supplied to the touch sensing part 622 to degrade the function of the touch sensing part 622 in performance. Therefore, in the present invention, the sensing switch 621 is included in the sensing signal receiver 620, and thus, the common voltage can be prevented from being supplied to the touch sensing part 622 through the receiving electrode to which the common voltage is being supplied.

Finally, the touch sync signal generator 630 generates a touch sync signal for controlling an operation of the switching unit 610.

The touch sync signal generator 630 transfers a first touch sync signal to the scan input switches, connected to the scan input electrode unit 150 corresponding to the scan input gate lines receiving the scan signal, among the driving electrode switches 613 and receiving electrode switches 613 included in the switching unit 610. Here, the first touch sync signal connects the scan input electrode unit to the common voltage generator 700. The touch sync signal generator 630 sequentially transfers the first touch sync signal to the scan input switches connected to the scan input electrode unit corresponding to the changed scan input gate lines according to the scan input gate lines being sequentially changed. However, as described above, the common voltage may be continuously supplied to all of the electrode units receiving the driving voltage. That is, the touch sync signal generator 630 transfers the first sync signal to the scan input switches connected to the driving electrodes and receiving electrodes formed in the scan input electrode unit intended to receive the common voltage. In this case, the scan input switch connects the driving electrodes and the receiving electrodes formed in the corresponding electrode unit to the common voltage generator 700. The method of driving the switches with the first touch sync signal may be variously changed depending on a method of supplying the scan signal to the gate line.

Moreover, the touch sync signal generator 630 transfers a second touch sync signal to the scanned switches, connected to the scanned electrode unit 150 corresponding to the scanned gate lines receiving the scan signal, among the driving electrode switches 613 and receiving electrode switches 613 included in the switching unit 610. Here, the second touch sync signal sequentially connects the driving electrodes 111 formed in the scanned electrode unit to the driving voltage generator 800. The touch sync signal generator 630 sequentially transfers the second touch sync signal to the scanned switches connected to the scanned electrode unit corresponding to the changed scanned gate lines according to the scanned gate lines being sequentially changed. That is, the touch sync signal generator 630 sequentially transfers the second sync signal to the scanned switches connected to the driving electrodes formed in the scanned electrode unit intended to receive the driving voltage.

Hereinafter, a method of driving the LCD device including the above-described elements will be described with reference to FIG. 8. As described above, each of the receiving electrodes 121 may be formed to correspond to at least one gate line, and each of the driving electrodes 111 may be formed to correspond to at least one data line. In FIG. 8, particularly, one receiving electrode is formed in the liquid crystal panel to correspond to three gate lines, and thus, the panel illustrated in FIG. 8 will be described below as an example of the present invention. Moreover, the touch panel includes a plurality of electrode units which are formed in a vertical direction of the liquid crystal panel, namely, in a direction parallel to the gate lines.

A method of driving a LCD device according to the present invention is divided to two steps.

In a first step, a common voltage is applied to the electrode units 150 including a plurality of the driving electrodes 111, which are formed in a vertical direction of the liquid crystal panel and are parallel to the data lines, and a plurality of the receiving electrodes 121, which are parallel to the gate lines to intersect the driving electrodes, for one frame period. In a second step, driving voltages are sequentially applied to scanned driving electrodes formed in scanned electrode unit corresponding to scanned gate lines among the electrode units 150 to detect a touch while the common voltage is applied to the electrode units 150 through the first step.

The first step is a step of supplying a common voltage, and in the first step, as described above, a common voltage is supplied to all of the electrode units. That is, a common voltage is continuously supplied to all of the electrode units, and in the second step to be described below, a driving voltage is supplied to only a specific electrode unit from which a touch is detected.

The second step is a step of detecting a touch, and is subdivided into the following steps.

The step of detecting a touch denotes a step that determines whether there is a touch in the liquid crystal panel by using a sensing signal received from the receiving electrodes, according to a driving voltage applied from the driving electrodes formed in the corresponding electrode unit, in units of an electrode unit 150.

First, if a scan signal is sequentially inputted to all of the gate lines GL1 to GLa corresponding to the first electrode unit, as shown in a portion (b) of FIG. 8, a driving voltage is supplied to the driving electrodes 1T1 to 1Tk formed in the first electrode unit. That is, the common voltage is supplied to the driving electrodes 1T1 to 1Tk formed in the first electrode unit for a first period where the scan signal is inputted to at least one of the gate lines corresponding to the first electrode unit. Also, the driving voltage is sequentially supplied to the driving electrodes 1T1 to 1Tk formed in the first electrode unit for a second period. In this case, the sensing signal receiver determines whether there is a touch by using sensing signals received through the receiving electrodes 1R1 to 1Rs formed in the first electrode unit. However, after the driving voltage is inputted, as shown in a portion (b) of FIG. 8, the common voltage may be again inputted to the first electrode unit.

In a portion (b) of FIG. 8, a level of the driving voltage sequentially inputted to the driving electrodes 1T1 to 1Tk formed in the first electrode unit for the second period may be greater than that of the common voltage inputted to the driving electrodes 1T1 to 1Tk formed in the first electrode unit for the first period. For example, the driving voltage Vd may have a voltage, corresponding to the common voltage Vcom, as a low-level voltage, and have a voltage greater than the low-level voltage as a high-level voltage.

Next, the common voltage is inputted to the driving electrodes 2T1 to 2Tk formed in the second electrode unit for the second period where the scan signal is sequentially inputted to all of the gate lines GLa+1 to GL2a corresponding to the second electrode unit. Also, after the scan signal is inputted, the driving voltage is sequentially inputted to the driving electrodes 2T1 to 2Tk formed in the second electrode unit for a third period. However, as described above, after the driving voltage is inputted, the common voltage may be again inputted to the second electrode unit.

Finally, the above-described process may be repeatedly performed to a Pth electrode unit. Therefore, even though a portion (b) of FIG. 8 shows that the common voltage Vcom is applied to the first electrode unit and the second electrode unit for the first period and the driving voltage Vd is sequentially inputted to the driving electrodes PT1 to PTk formed in the Pth electrode unit for the first period, the driving voltage sequentially inputted to the electrodes PT1 to PTk formed in the Pth electrode unit may be sequentially inputted to the driving electrodes PT1 to PTk formed in the Pth electrode unit for a vertical blank period between a first frame and a second frame. That is, the above-described process is repeatedly performed in each of the electrode units, and the common voltage is inputted to the electrodes PT1 to PTk formed in the Pth electrode unit for a pth period where the scan signal is inputted to all of the gate lines GL(p−1)a+1 to GLpa corresponding to the Pth electrode unit which is the last electrode unit. Also, after the pth period where the scan signal is inputted, the driving electrode voltage may be sequentially inputted to the driving electrodes TP1 to PTk formed in the Pth electrode unit. In this case, the driving voltage for detecting a touch may be inputted to the driving electrodes PT1 to PTk formed in the Pth electrode unit for the vertical blank period between the first frame and the second frame, or as shown in a portion (b) of FIG. 8, the driving voltage for detecting a touch may be inputted to the first period of the second frame.

Moreover, a portion (b) of FIG. 8 shows that the common voltage Vcom is applied to the first electrode unit and the second electrode unit for the first period and the driving voltage Vd is sequentially inputted to the driving electrodes PT1 to PTk formed in the Pth electrode unit for the first period, but the driving voltage may be sequentially inputted to the electrodes 2T1 to 2Tk formed in the second electrode unit to enable a touch to be detected.

One frame period, for example, the first frame elapses, and then, if a new frame period, for example, the second frame is started, the process described above with reference to the portion (b) of FIG. 8 is repeated.

The above-described present invention relates to an in-cell type LCD device. In the present invention, a direction of the driving electrodes to which the driving voltage for detecting a touch is inputted is vertical to the gate lines, and the driving electrodes are separated from each other in a vertical direction of the liquid crystal panel, namely, in a direction parallel to the gate lines. Also, in the present invention, by disposing the receiving electrodes in a direction parallel to the gate lines, the image display operation and a touch sensing operation may be sequentially performed without time division.

According to the above-described present invention, when a liquid crystal panel having the same sectional surface as that of a liquid crystal panel of a related art in-cell type LCD device is used, it is possible to perform a touch sensing function without time division.

According to the present invention, by driving a plurality of driving electrodes formed in a electrode unit corresponding to gate lines, to which a scan signal has been supplied, to detect a touch, when a scan signal is being sequentially supplied to a plurality of gate lines, the in-cell type touch panel can be driven regardless of the resolution and size of the liquid crystal panel.

That is, the present invention can drive the touch panel and the liquid crystal panel without time division when the in-cell type touch panel is used, save the additional cost by removing a time-division scheme, and secure a sufficient driving time by simultaneously performing the image display function and the touch sensing function, thus enhancing the image output function and the touch sensing function.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A liquid crystal display (LCD) device comprising:
   a liquid crystal panel configured to comprise a TFT substrate and a color filter substrate which are coupled to each other with a liquid crystal layer therebetween;
   a touch panel configured to comprise a plurality of electrode units parallel to the gate lines to detect a touch, each of the electrode units comprising a plurality of driving electrodes, formed in parallel to data lines formed in the TFT substrate, and a plurality of receiv- ing electrodes formed in parallel to gate lines formed in the TFT substrate to intersect the driving electrodes;
a common voltage generator configured to generate a common voltage;
a touch sensing circuit configured to supply the common voltage to the electrode units and supply a driving voltage to driving electrodes formed in scanned electrode units, corresponding to scanned gate lines which have received a scan signal for one frame period, to detect a touch; and
a driving voltage generator configured to generate the driving voltage,
wherein the driving electrodes configuring one of the electrode units are separate from the driving electrodes configuring another of the electrode units in a direction of the data lines;
wherein the driving electrodes of each of the respective electrode units are parallel to each other in a direction of the gate lines, and the gate lines are perpendicular to the data lines;
wherein there are at least three electrode units in a direction parallel to the data lines;
wherein the touch sensing circuit includes a switching circuit and a touch sync signal generator;
wherein the switching circuit includes:
   a plurality of driving electrode switches configured to connect the driving electrodes to the common voltage generated by the common voltage generator and to the driving voltage generated by the driving voltage generator; and
   a plurality of receiving electrode switches configured to connect the receiving electrodes to the common voltage generated by the common voltage generator;
wherein the touch sync signal generator generates a touch sync signal for controlling an operation of the switching unit;
wherein the touch sync signal generator transfers a first touch sync signal to at least two switches among the driving electrode switches and receiving electrode switches, the first touch sync signal connecting the at least two switches to the common voltage generator;
wherein the touch sync signal generator transfers a second touch sync signal to the at least two switches among the driving electrode switches and receiving electrode switches, the second touch sync signal sequentially connecting the at least two switches to the driving voltage generator;
wherein when the common voltage is supplied to the driving electrodes and the receiving electrodes of one of the electrode units, the touch sensing circuit supplies the driving voltage to the driving electrodes configuring the another electrode unit to detect a touch in the another electrode unit, and
wherein the touch sensing circuit further comprises:
a sensing signal receiver configured to determine whether there is a touch, the sensing signal receiver including:
   a touch sensing part that determines whether there is the touch by using sensing signals received from the receiving electrodes; and
   a plurality of sensing switches that are connected between the touch sensing part and each of the receiving electrodes,
wherein the plurality of sensing switches disconnect the touch sensing part from each of the receiving electrodes that are connected to the common voltage generated by the common voltage generator by the plurality of receiving electrode switches, to thereby avoid degradation of the touch sensing part.

2. The LCD device of claim 1, wherein,
the driving electrodes and the receiving electrodes configuring the touch panel are formed on the same layer of the TFT substrate.

3. The LCD device of claim 1, wherein
the switching circuit is configured to perform a common voltage transferring operation that connects the electrode units to the common voltage generator and perform a driving voltage transferring operation where the driving electrodes formed in the scanned electrode unit connected to the common voltage generator through the common voltage transferring operation are sequentially connected to the driving voltage generator.

4. The LCD device of claim 3, wherein,
the touch sync signal generator sequentially transfers the second touch sync signal, which allows the driving electrodes formed in the scanned electrode unit to be sequentially connected to the driving voltage generator, to scanned switches of the switches connected to the scanned electrode unit corresponding to the scanned gate lines, and
the touch sync signal generator transfers the first touch sync signal, which allows the driving electrode units connected to the switches to be connected to the common voltage generator, to the switches, the second touch sync signal being not inputted to the switches.

5. The LCD device of claim 4, wherein,
the touch sync signal generator transfers a third touch sync signal to scan input sensing switches connected to scan input receiving electrodes formed in a scan input electrode unit connected to the scan input switches among the sensing switches, the third touch sync signal allowing the scan input sensing switch to be separated from the touch sensing part.

6. A method of driving a liquid crystal display (LCD) device, the method comprising:
supplying a common voltage to a plurality of electrode units parallel to a plurality of gate lines, each of the electrode units comprising a plurality of driving electrodes, formed in parallel to a plurality of data lines, and a plurality of receiving electrodes formed in parallel to the gate lines to intersect the driving electrodes, wherein the driving electrodes configuring one of the electrode units are separate from the driving electrodes configuring another of the electrode units in a direction of the data lines; and
supplying a driving voltage to driving electrodes formed in scanned electrode units, corresponding to scanned gate lines which have received a scan signal for one frame period, to detect a touch while the common voltage is supplied to the electrode units,
wherein the driving electrodes of each of the respective electrode units are parallel to each other in a direction of the gate lines, and the gate lines are perpendicular to the data lines;
wherein there are at least three electrode units in a direction parallel to the data lines;
wherein when the common voltage is supplied to the driving electrodes and the receiving electrodes of one of the electrode units, a touch sensing circuit supplies the driving voltage to the driving electrodes configuring the another electrode unit to detect a touch in the another electrode unit; and
wherein the touch sensing circuit includes a switching circuit and a touch sync signal generator;

wherein the switching circuit includes:
  a plurality of driving electrode switches configured to connect the driving electrodes to the common voltage generated by a common voltage generator and to the driving voltage generated by a driving voltage generator; and
  a plurality of receiving electrode switches configured to connect the receiving electrodes to the common voltage generated by the common voltage generator,
wherein the touch sync signal generator generates a touch sync signal for controlling an operation of the switching unit;
wherein the touch sync signal generator transfers a first touch sync signal to at least two switches among the driving electrode switches and receiving electrode switches, the first touch sync signal connecting the at least two switches to the common voltage generator;
wherein the touch sync signal generator transfers a second touch sync signal to the at least two switches among the driving electrode switches and receiving electrode switches, the second touch sync signal sequentially connecting the at least two switches to the driving voltage generator, and
wherein the touch sensing circuit further comprises:
a sensing signal receiver configured to determine whether there is a touch, the sensing signal receiver including:
  a touch sensing part that determines whether there is the touch by using sensing signals received from the receiving electrodes; and
  a plurality of sensing switches that are connected between the touch sensing part and each of the receiving electrodes,
wherein the plurality of sensing switches disconnect the touch sensing part from each of the receiving electrodes that are connected to the common voltage generated by the common voltage generator by the plurality of receiving electrode switches, to thereby avoid degradation of the touch sensing part.

7. The method of claim 6, wherein,
the driving voltage has a voltage, corresponding to the common voltage, as a low-level voltage, and has a voltage greater than the low-level voltage as a high-level voltage.

8. The method of claim 6, wherein,
each of the electrode units is formed in a liquid crystal panel in correspondence with a plurality of gate lines, and
the common voltage is continuously supplied to all of the electrode units except a electrode unit receiving the driving voltage.

9. The method of claim 6, wherein the supplying a driving voltage to detect a touch comprises:
  sequentially supplying the driving voltage to driving electrodes formed in one of the scanned electrode units, and determining whether there is a touch by using a plurality of sensing signals generated from a plurality of receiving electrodes formed in the one scanned electrode unit; and
  sequentially supplying the driving voltage to driving electrodes formed in another scanned electrode unit, and determining whether there is a touch by using a plurality of sensing signals generated from a plurality of receiving electrodes formed in the other scanned electrode unit.

* * * * *